US011687323B2

(12) United States Patent
Antinori et al.

(10) Patent No.: US 11,687,323 B2
(45) Date of Patent: Jun. 27, 2023

(54) CONFIGURABLE MULTI-INPUT WEB FORMS FOR CODE EDITORS

(71) Applicant: Red Hat, Inc., Raleigh, NC (US)

(72) Inventors: Paolo Antinori, Milan (IT); Lars Heinemann, Grasbrunn (DE)

(73) Assignee: RED HAT, INC., Raleigh, NC (US)

( * ) Notice: Subject to any disclaimer, the term of this patent is extended or adjusted under 35 U.S.C. 154(b) by 153 days.

(21) Appl. No.: 17/158,210

(22) Filed: Jan. 26, 2021

(65) Prior Publication Data
US 2022/0236963 A1 Jul. 28, 2022

(51) Int. Cl.
G06F 8/30 (2018.01)
G06F 8/33 (2018.01)
G06F 16/958 (2019.01)
G06F 9/54 (2006.01)
G06F 8/36 (2018.01)

(52) U.S. Cl.
CPC .............. G06F 8/33 (2013.01); G06F 8/36 (2013.01); G06F 9/547 (2013.01); G06F 16/958 (2019.01)

(58) Field of Classification Search
CPC ..... G06F 8/30; G06F 8/36; G06F 8/33; G06F 40/174; G06F 40/151; G06F 9/547; G06F 16/958; G06F 8/38
See application file for complete search history.

(56) References Cited

U.S. PATENT DOCUMENTS

| | | | |
|---|---|---|---|
| 8,181,156 B1 | 5/2012 | Bobykin et al. | |
| 8,484,566 B2 | 7/2013 | Madhavan et al. | |
| 9,361,131 B1 * | 6/2016 | Gill | G06F 8/30 |
| 9,576,066 B2 | 2/2017 | Sampath-Kumar et al. | |
| 10,636,387 B2 | 4/2020 | Imms | |
| 11,068,644 B1 * | 7/2021 | Beiderman | G06F 40/174 |
| 2004/0205525 A1 * | 10/2004 | Murren | G06F 40/174 715/234 |
| 2013/0339841 A1 * | 12/2013 | Petti | G06F 40/151 715/234 |

OTHER PUBLICATIONS

Wu et al, CN 111935516, "Playing Method, Device, Terminal, Serverand Storage Medium of Audio File" (translation), Nov. 13, 2020, 28 pgs <CN_111935516.pdf>.*
Singh; Generating Config Driven Dynamic Forms using Web Components; Mar. 8, 2019; 18 pages.
Jankoehnlein; Graphical vs Code Extensions with Eclipse Sprotty; Dec. 20, 2019; 5 pages; TypeFo.
Author unknown; Cat Coding—A Webview API Sample; 2020; 3 pages; GitHub, Inc.
Author unknown; Webview API; 2020; 24 pages; Microsoft.

\* cited by examiner

Primary Examiner — Tuan A Vu
(74) Attorney, Agent, or Firm — K&L Gates LLP (57) ABSTRACT

Various techniques and systems are described herein for providing a multi-input form using a code editor. In various examples, an application programming interface (API) of the code editor used to generate software extensions may be identified. A library may be imported into the API. The library may be configured to implement WebView content within the code editor. One or more commands may be generated using at least one object defined in the library. The one or more commands may define a plurality of input fields to be displayed in the WebView content to a user invoking the API. In various examples, an invocation of the API may be received and the WebView content comprising the plurality of input fields may be displayed.

20 Claims, 6 Drawing Sheets

```
TS extension.ts  x
src > ts extension.ts > ⓜ activate > [ ] disposable > ⓜ vscode.comands.registerCommand('webforms.show') callback
1   // The module 'vscode' contains the VS Code extensibility API
2   // Import the module and reference it with the alias vscode in your code below
3   import * as vscode from 'vscode';
4   import {CustomDialog, DialogElement} from './form';
5
6   export let pluginPath: string;
7
8   // this method is called when your extension is activated
9   // your extension is activated the very first time the command is executed
10  export function activate(context: vscode.ExtensionContext) {
11
12      pluginPath = context.asAbsolutePath('./');
13
14      // Use the console to output diagnostic information (console.log) and errors (console.error)
15      // This line of code will only be executed once when your extension is activated
16      console.log('Congratulations, your extension "webforms" is now active!');
17
18      // The command has been defined in the package.json file
19      // Now provide the implementation of the command with registerCommand
20      // the commandId parameter must match the command field in package.json
21      let disposable = vscode.commands.registerCommand('webforms.show', () => {
22          let fields: DialogElement[] = new Array();
23          fields.push(new DialogElement('firstName', 'text', 'First Name', 'Pavel'));
24          fields.push(new DialogElement('lastName', 'text', 'Last Name', 'Kokov'));
25          fields.push(new DialogElement('newsletter', 'checkbox', 'Subscribe Newsletter', 'true'));
26          const dialog: CustomDialog = new CustomDialog('MyTitle', 'My Special Summary', fields);
27          dialog.show();
28      });
29
```

CONFIGURABLE MULTI-INPUT WEB FORMS FOR CODE EDITORS

BACKGROUND

Many code editors (such as Visual Studio Code) offer extension capabilities to extend the functionality of the code editors. For example, some code editors offer extension application programming interfaces (APIs) that allow developers to add different functionality, such as changing the theme (e.g., color, formatting, icon themes, etc.) of the code editor, adding support for a new programming language, support debugging a specific runtime, adding custom components and/or views to the user interface, etc.

SUMMARY

The present disclosure provides new and innovative systems and methods for generating configurable multi-input web forms for code editors. In an example, a method includes identifying an application programming interface (API) of a code editor. In at least some examples, the API may be used to generate software extensions. In some further examples, a library may be imported into the API. The library may be configured to implement browser-based content within the code editor. In further examples, one or more commands may be generated using at least one object defined in the library. The one or more commands may define a plurality of input fields to be displayed in the browser-based content to a user invoking the API. In various further examples, an invocation of the API may be received. In various examples, instructions may be generated to cause the display of the browser-based content comprising the plurality of input fields.

In another example, a system includes at least one processor configured in communication with non-transitory computer-readable memory. In an example, the at least one processor is configured to identify an application programming interface (API) of the code editor. In some examples, the API may be used to generate software extensions. In some examples, the processor may be further configured to import a library into the API. The library may be configured to implement browser-based content within the code editor. In some other examples, the at least one processor may be further configured to generate one or more commands using at least one object defined in the library. The one or more commands may define a plurality of input fields to be displayed in the browser-based content to a user invoking the API. In other examples, the at least one processor may be configured to receive an invocation of the API. In some examples, the at least one processor may cause the browser-based content comprising the plurality of input fields to be displayed.

In an example, a non-transitory machine readable medium may store a program, which when executed by at least one processor causes the processor to identify an application programming interface (API) of a code editor. In some examples, the API may be used to generate software extensions. In various examples, the program may be further effective to import a library into the API. In various examples, the library may be configured to implement browser-based content within the code editor. In further examples, the program, when executed by the at least one processor, may be further effective to generate one or more commands using at least one object defined in the library. In various examples, the one or more commands may define a plurality of input fields to be displayed in the browser-based content to a user invoking the API. In some further examples, the program may be further effective to receive an invocation of the API. In various other examples, the program, when executed by the at least one processor, may be further effective to cause the browser-based content comprising the plurality of input fields to be displayed.

Additional features and advantages of the disclosed method and system are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for dynamic generation of configurable multi-input web forms for code editors. In various examples, code editors (e.g., source code editors) may be text editor program designed for editing source code of computer programs. In various examples, code editors may be standalone applications or may be built into an integrated development environment (IDE) and/or a web browser. Examples of code editors include Sublime Text 3, Visual Studio Code ("VSCode"), Codespaces, etc. Code editors include native interfaces (e.g., application programming interfaces (APIs)) that display graphics of the code editor (e.g., colors, layouts, formatting, etc.) in a pre-defined and pre-set way.

Code editors often include extension APIs that may be used by developers to impart new functionality to the code editor. For example, VSCode provides an Extension API that provides the ability to change the look of the VS Code interface (e.g., changing colors, file icon themes), provides the ability to add custom components and views in the user interface, create WebViews to display custom webpages built using hypertext markup language (HTML)/Cascading Style Sheets (CSS)/Javascript (JS), provides the ability for the code editor to support new programming languages, custom runtime debugging, etc. However, in some cases, the extension APIs of such code editors are limited in the nature of inputs that may be processed. Further, in some examples, the further the functionality provided by the native interfaces of such extension APIs may not be optimal for all use cases.

For example, the VSCode extension API offers only a single visual input text field for input of user data. A single widget is used by the VSCode extension API to present a single visual field to prompt for user input. This limit forces the developer that needs to provide multiple queries for user input to present a serial list of such visual fields using the widget. There is no option provided by the VSCode extension API to prompt for more than one user input at a time. This may lead to a frustrating experience that is slow and primitive.

In order to overcome the above-described limitation of such code editor user interface/user experience issues, described herein is an approach that leverages existing code editor functionality to provide configurable multi-input forms that maintain the native look and feel of the particular code editor. As previously described, many code editors include functionality allowing the code editor to create and display WebViews. A WebView is an embeddable browser engine that a native application—in this case the code editor—can use to display browser-based content (e.g., web content such as HTML/CSS/JS). A WebView can be inserted into a native application similar to insertion of an iframe into a native application, and the browser engine (e.g., the WebView) may be entirely customizable. Although "WebViews" are generally discussed herein, any code editor libraries configured to generate web content (e.g., browser-based content) may be used in accordance with the various techniques described herein.

Accordingly, a developer may import a WebView library into the API of the code editor (e.g., the VSCode extension API). The developer may generate one or more commands using one or more objects defined in the WebView library to generate a multi-input WebView form to be displayed. The WebView form may be customized to include any desired appearance and functionality. For example, the WebView form may include multiple input fields, which may be impossible using the native code editor interface. Additionally, since the WebView can execute JavaScript, business logic and/or validation may be provided (e.g., comparing the value of a first field to a threshold value, performing calculations, etc.). Further, the WebView may be customized to provide the desired functionality and even to mimic the native look and feel of the code editor so that the WebView form appears to be part of the native API of the code editor.

Such WebView forms may provide bi-directional communication with the code editor. The code of the extension API used to implement the WebView form controls what is displayed (as well as functionality) of the WebView form. Additionally, the data received (e.g., in the fields displayed in the WebView form) may be communicated to the code editor. Additionally, described herein is a configuration for implementing the customizable WebView forms within the code editors that developers may use to generate such customizable WebView forms without having to write the HTML, page themselves. For example, a WebView library may be published (e.g., as a TypeScript library, a JS library, etc.) with various commands affecting the type of content to be displayed in the WebView form. Thereafter, a user need only import the WebView library in order to use the customized WebView content providing the configured appearance/functionality.

Figure 1:
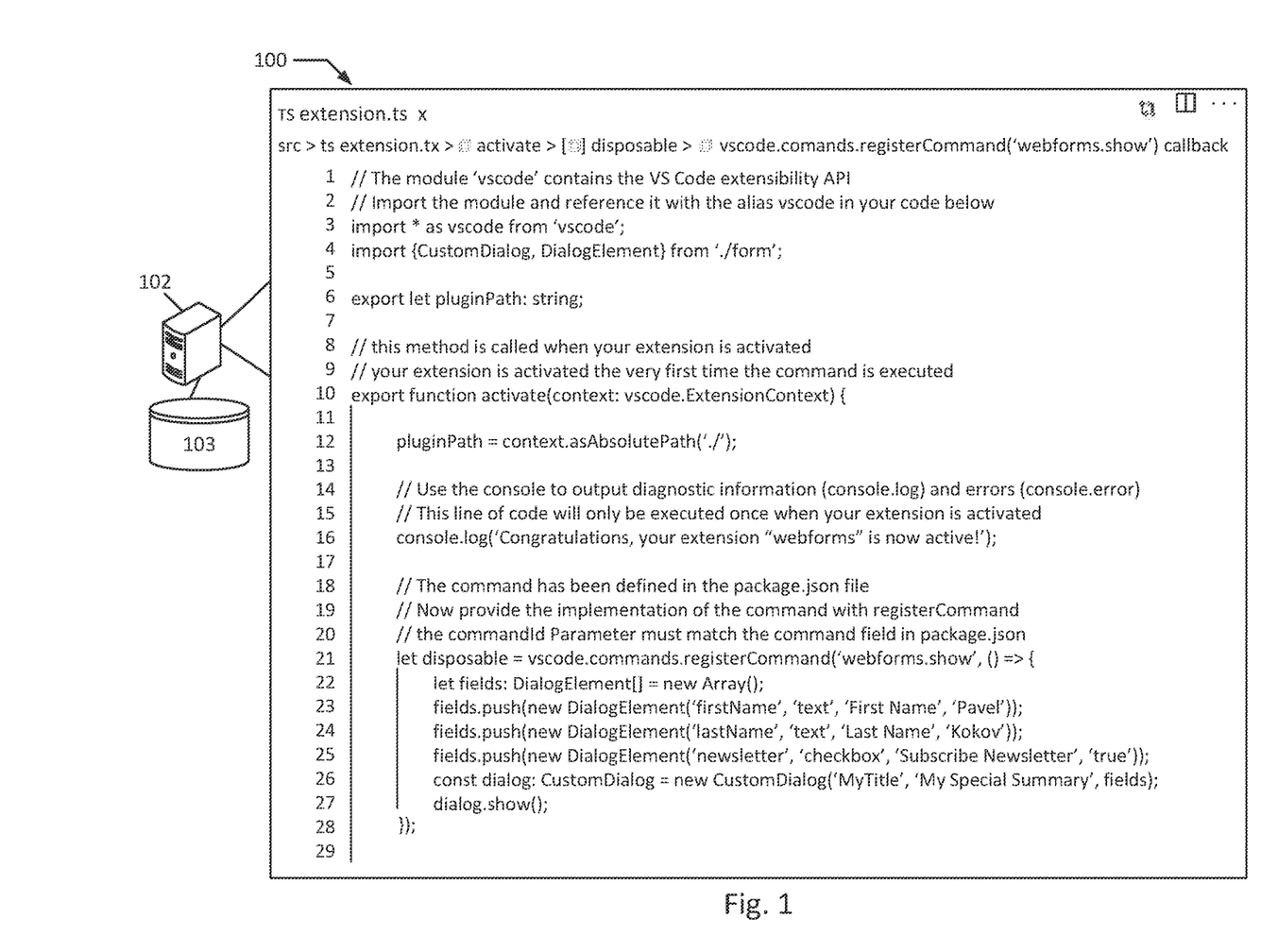
FIG. 1 illustrates an example modification of a code editor extension API that may be used to provide multi-input capability according to an example embodiment of the present disclosure.

FIG. 1 illustrates example modification of a code editor extension API 100 that may be used to provide multi-input capability, according to various examples of the present disclosure. The code in FIG. 1 represents an example of a code editor extension API (e.g., VSCode extensibility API) that may be used to extend the functionality of the code editor, as described above.

In various examples, a computing device 102 may include at least one processor and may be in configured in communication with non-transitory computer-readable memory 103. The non-transitory computer-readable memory 103 may store instructions that, when executed by at least one processor of computing device 102 may be effective to perform the various techniques described herein related to providing configurable and customized browser-based content for an extension API of a code editor. Computing device 102 may execute a code editor that may include extension API 100 and may support browser-based content generation libraries (e.g., WebView generation libraries).

In line 4 of the API 100, the WebView content generation library is imported including the objects {CustomDialog, DialogElement}. Commands are generated in lines 22-26 to use these imported objects in order to generate customized WebView content. As previously described, this custom WebView content may overcome limitations of the native user interface of the code editor. For example, the extension API of VSCode only supports a single input dialog field at a time. For example, interface 200 of FIG. 2 may represent a native user interface of a code editor supporting only a single input field 202. Using the native interface of the code editor, a developer may be required to generate a series of queries in order to receive all desired user input at the code editor.

By contrast, the API 100 has been modified to generate WebView content that generates multiple input fields. For example, the modifications of the API 100 may enable the generation of interface 210 of FIG. 2 comprising the modified, multi-input WebView content 212. Additionally, the data received in the multiple input fields may be programmatically integrated into the extension API of the code editor, as defined in lines 22-26 of the code in FIG. 1. The commands in lines 22-26 of FIG. 1 use the object DialogElement of the WebView content generation library (imported at line 4) to generate WebView content comprising an input field for a user's First Name, Last Name, and a checkbox field for subscribing to a newsletter (as displayed in WebView content 212 of interface 210). Additionally, line 26 of FIG. 1 defines a title field in which the user has input the title "My Special Summary" in the WebView content 212. The modified extension API 100 (incorporating the modified WebView generation library) may be published as a developer library (e.g., a TypeScript library, JS library, etc.) which may be imported by users desiring the multi-input functionality provided thereby. In general, the input fields defined using the modified extension API 100 may receive any type of data. For example, the received data may be data related to a new software extension being authored by the user. The received data may include, for example, a name of the user, a name of the software extension, a version number, a storage location, etc.

Figure 2:
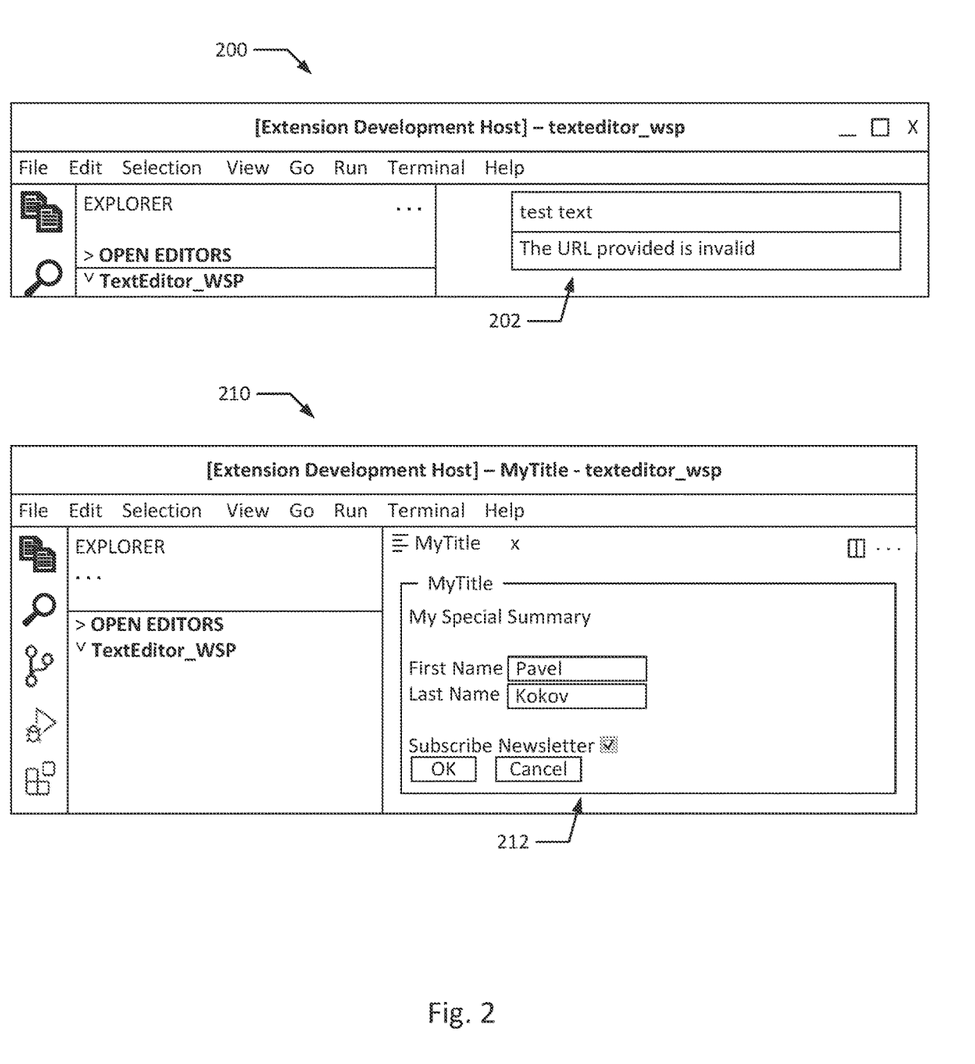
FIG. 2 illustrates two example user interfaces of an extension API of a code editor, according to various aspects of the present disclosure.

Communication between the WebView content and the code editor may be bi-directional. For example, the modified extension API 100 causes the WebView content 212 to be generated and displayed as shown in FIG. 2. Additionally, data input into the fields may be incorporated into the modified extension API 100 of the code editor as defined by the commands in lines 22-26. For example, in WebView content 212, a user has entered "Pavel" into the First Name input field of the WebView content 212. Accordingly, the text data "Pavel" may be sent to the code editor (e.g., to the modified extension API 100) and may programmatically be used according to logic of the code editor. For example, metadata of the extension being developed may have a "First Name" field that may be populated using "Pavel" received from the WebView content 212. Similarly, in WebView content 212, a user has entered "Kokov" into the Last Name input field of the WebView content 212. Accordingly, the text data "Kokov" may be sent to the code editor (e.g., to the modified extension API 100) and may programmatically be used according to logic of the code editor.

Data representing a look and feel (e.g., theme data) being used by a particular user of the code editor may be read by the host platform of the code editor. Thereafter, when a user calls the modified extension API 100, the theme data read from the host platform may be used to maintain the current theme (e.g., text color, background color, icon type, text format, general formatting, etc.) in the generated WebView content (e.g., WebView content 212). Accordingly, the WebView content 212 may appear to the user as being native to the host platform of the code editor.

Additionally, a developer may modify the extension API 100 to include business logic and/or validation logic. For example, pre-submit logic may be used to validate one or more input fields in the WebView content 212 prior to submission of the form. Additionally, validation of multiple input fields (displayed as part of the WebView content 212) may be accomplished. By contrast, the native code editor interface may only present a single input field at a time, and thus may only validate the single field for a given submit.

Typically, a software extension that uses a webpage use TypeScript and/or the code for the HTML, page itself. In order to maintain a similar look and feel to an extension API of a code editor, the TypeScript and/or the code for the HTML page would be carefully synced with the extension API to maintain consistency. However, by using a pre-published modified extension API 100, consistency between the extension API and the WebView content may be programmatically maintained without requiring a user to hard-code the web content.

Note that the particular modifications to the modified extension API 100 depicted in FIG. 1 are by way of example only. In general, any modifications can be made using commands and/or objects included in a WebView generation library (or other browser-based content generation library), according to the specific WebView content (and/or functionality of the WebView content) to be generated.

Figure 3:
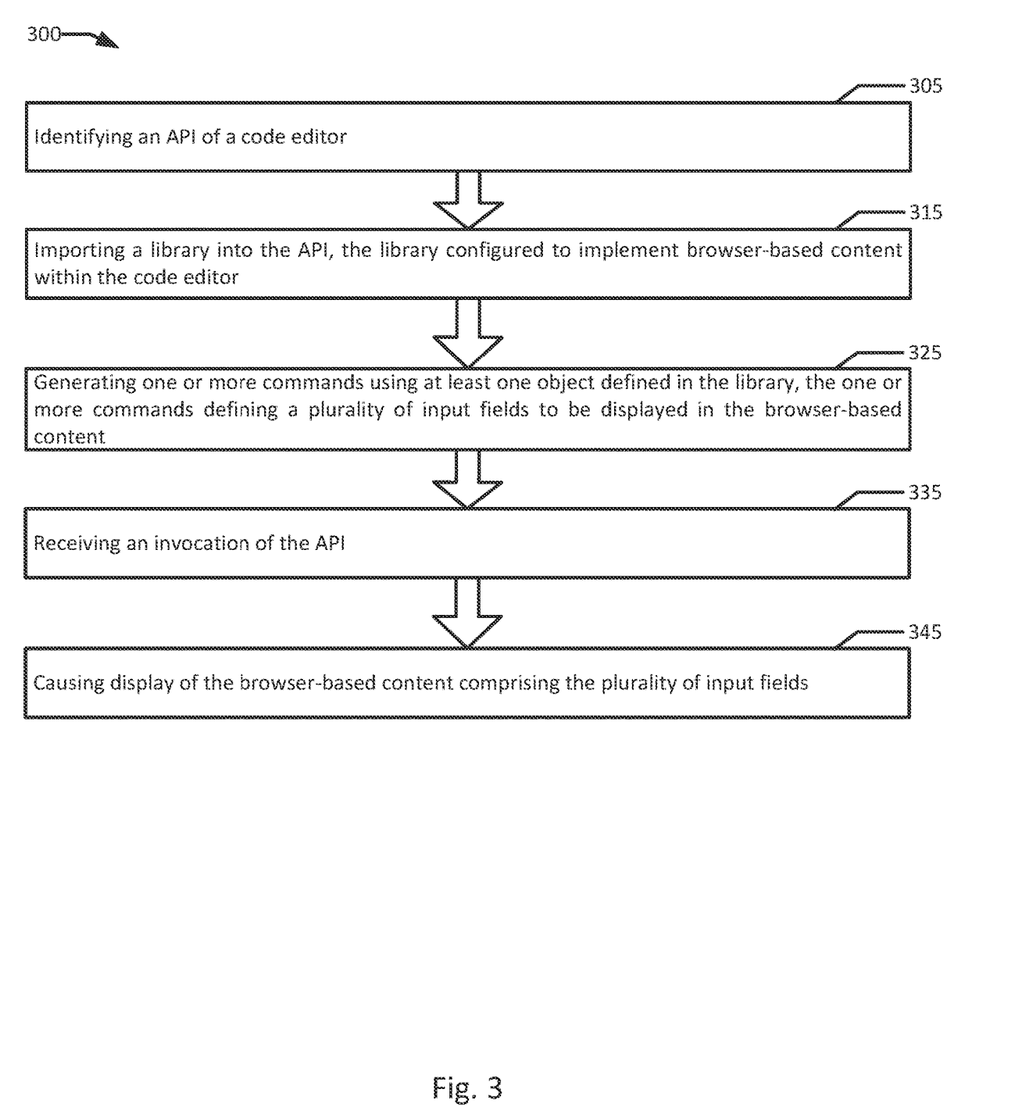
FIG. 3 illustrates a flowchart of an example process for generating configurable multi-input web forms for code editors, according to an example embodiment of the present disclosure.

FIG. 3 illustrates a flowchart of an example process 300 for generating configurable multi-input web forms for code editors, according to an example embodiment of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 may begin with identifying an API of a code editor (block 305). For example, an extension API (e.g., VSCode extension API) of a code editor may be identified. The extension API may be used for writing new software extensions.

The example process 300 may continue with importing a library into the API. The library may be configured to implement browser-based content within the code editor (block 315). For example, a WebView content generation library supported by the API may be imported. In the example depicted in FIG. 1, a WebView content generation library is imported at line 4.

The example process 300 may continue with generating one or more commands using at least one object defined in the library, where the one or more commands define a plurality of input fields to be displayed in the browser-based content (block 325). For example, one or more objects of the imported WebView content generation library (e.g., the {CustomDialog, DialogElement} objects in line 4 of FIG. 1) may be used to generate commands. For example, lines 22-26 of FIG. 1 use the DialogElement object to generate commands defining the various input fields displayed in the WebView content 212 example of FIG. 2.

Processing may continue with receiving an invocation of the API (block 335). For example, the modified extension API 100 may be invoked (e.g., called) by a user that wants to generate an extension. The user may import a library that includes the modified WebView content (e.g., including modifications such as those described in lines 22-26 of FIG. 1). In various examples, a developer may publish the library that includes the modified WebView content (e.g., WebView content displaying multiple input fields and/or including various business logic). Thereafter, the user that wants to use the functionality provided by the modified WebView content may incorporate the developer's library.

Processing may continue with causing display of the browser-based content comprising the plurality of input fields (block 345). The browser-based content (e.g., WebView content), as modified using the specific commands, may be displayed to the user. As previously described, the WebView content may be displayed using a native theme of the code editor's host platform. Additionally, data submitted by the user in the various input fields of the WebView content may be programmatically incorporated into the code editor's extension API according to the logic defined for the WebView content.

Figure 4A:
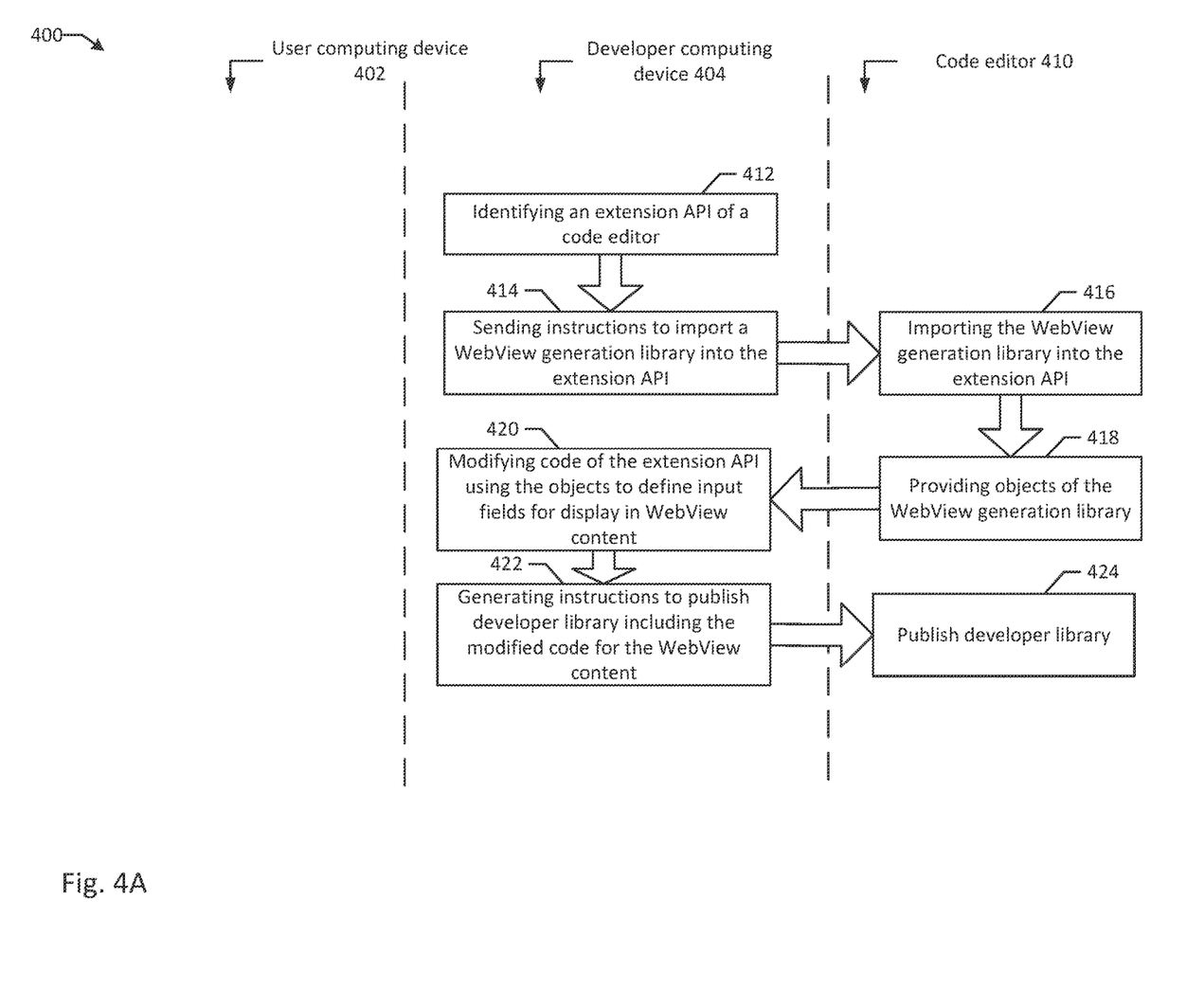
FIGS. 4A and 4B illustrate a flow diagram of an example process for generating configurable multi-input web forms for code editors, according to an example embodiment of the present disclosure.
Figure 4B:
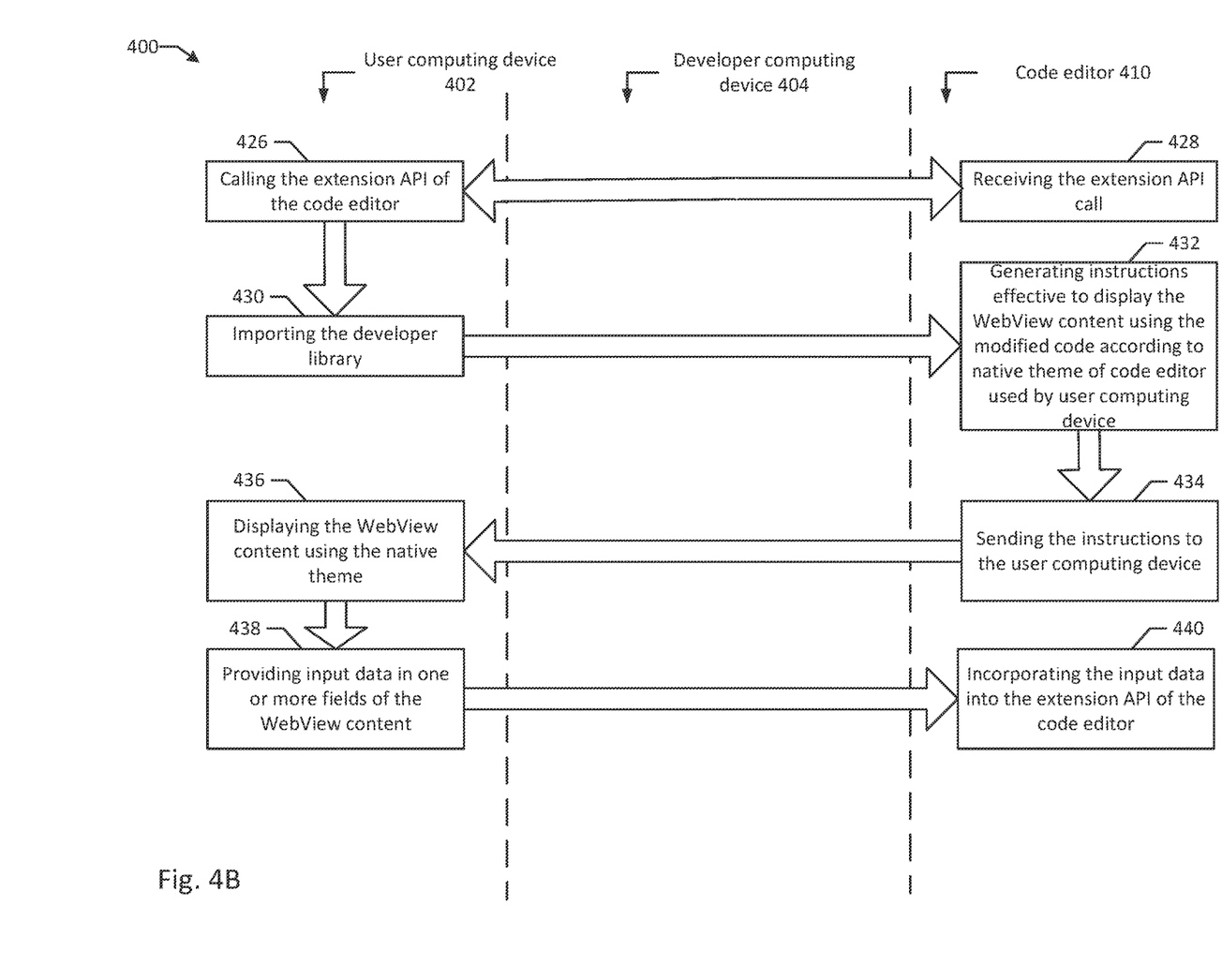

FIGS. 4A and 4B illustrate a flow diagram of an example process for generating configurable multi-input web forms for code editors, according to an example embodiment of the present disclosure. Although the example process 400 is described with reference to the flow diagram illustrated in FIGS. 4A, 4B, it will be appreciated that many other methods of performing the acts associated with the process 400 may be used. For example, the order of some of the blocks may be changed, certain blocks may be combined with other blocks, blocks may be repeated, and some of the blocks described are optional. The process 400 may be performed by processing logic that may comprise hardware (circuitry, dedicated logic, etc.), software, or a combination of both. In some examples, a combination of computing devices may execute the various actions described in reference to FIGS. 4A, 4B. For example, a developer using a developer computing device 404 may identify an extension API of a code editor (block 412). The extension API may be used for extending the functionality of the code editor (e.g., for creating extensions). The developer computing device 404 may send instructions to import a WebView generation library into the extension API (block 414). For example, a WebView generation library natively supported by the code editor may be imported.

The code editor 410 (e.g., a host platform of the code editor executed locally, remotely, or some combination of locally and remotely) may receive the instructions and may import the WebView generation library into the extension API (block 416). The WebView generation library may allow for the generation of WebView content that may be displayed in extensions created using the extension API. Generally, WebView content included in an extension may be coded using TypeScript and/or HTML code.

The code editor 410 may provide objects of the WebView generation library (block 418). For example, the WebView generation library may include various different objects associated with functionality of the WebView generation library. The objects may be provided (e.g., in a list) to the developer computing device 404.

The developer computing device 404 may modify code of the extension API using the objects to define input fields for display in WebView content (block 420). For example, the developer computing device 404 may generate commands effective to control the display and/or functionality of the WebView content. For example, in FIG. 1, lines 22-26 affect the display of the WebView content 212 of FIG. 2. The commands in lines 22-26 employ the objects imported from the WebView generation library imported in line 4 of FIG. 1.

Instructions may be generated to publish the developer library including the modified code for the WebView content (block 422). The developer may generate instructions to publish the modified API extension as a library. Thereafter, any user of the extension API may import the library to use the customized WebView content defined by the developer library. The developer library may be published by code editor 410 (block 424). Publication of the library may make the library available to properly authenticated users of the code editor 410 and/or of the extension API of the code editor 410.

After publication of the developer API, a user computing device 402 may call the extension API of the code editor (block 426, FIG. 4B). The user computing device 402 may call the extension API in order to generate an extension using the code editor 410. The code editor 410 may receive the extension API call (block 428). In some examples, the code editor 410 may determine theme data defining a native theme of the code editor 410 being used by the user computing device 402. Further, in some examples, the code editor 410 may send the WebView content generation library to the user computing device 402.

The user computing device 430 may import the developer library (block 430). The developer library may include the modifications to the native WebView content generation library described above in reference to FIG. 4A. The code editor 410 may generate instructions effective to display the WebView content using the modified code according to the native theme of the code editor being used by the user computing device (block 432). Accordingly, instructions for displaying the WebView content according to the commands in the developer library may be generated. The instructions may be sent to the user computing device (block 434). The user computing device 436 may display the WebView content using the native theme of the code editor for the user device 402. The WebView content may include multiple input fields, business logic, and/or validation logic according to the commands defining the WebView content generation in the imported developer library.

The user computing device 402 may provide input data in one or more fields of the WebView content (block 438). For example, the user may provide requested information in input fields of the WebView content. The particular information and input fields are dependent on the specific implementation. The code editor 410 may incorporate the input data into the extension API of the code editor (block 440). For example, the code editor 410 may incorporate the information provided by the user in the WebView content input fields into the extension API according to the particular logic of the imported developer library and the extension API.

Figure 5:
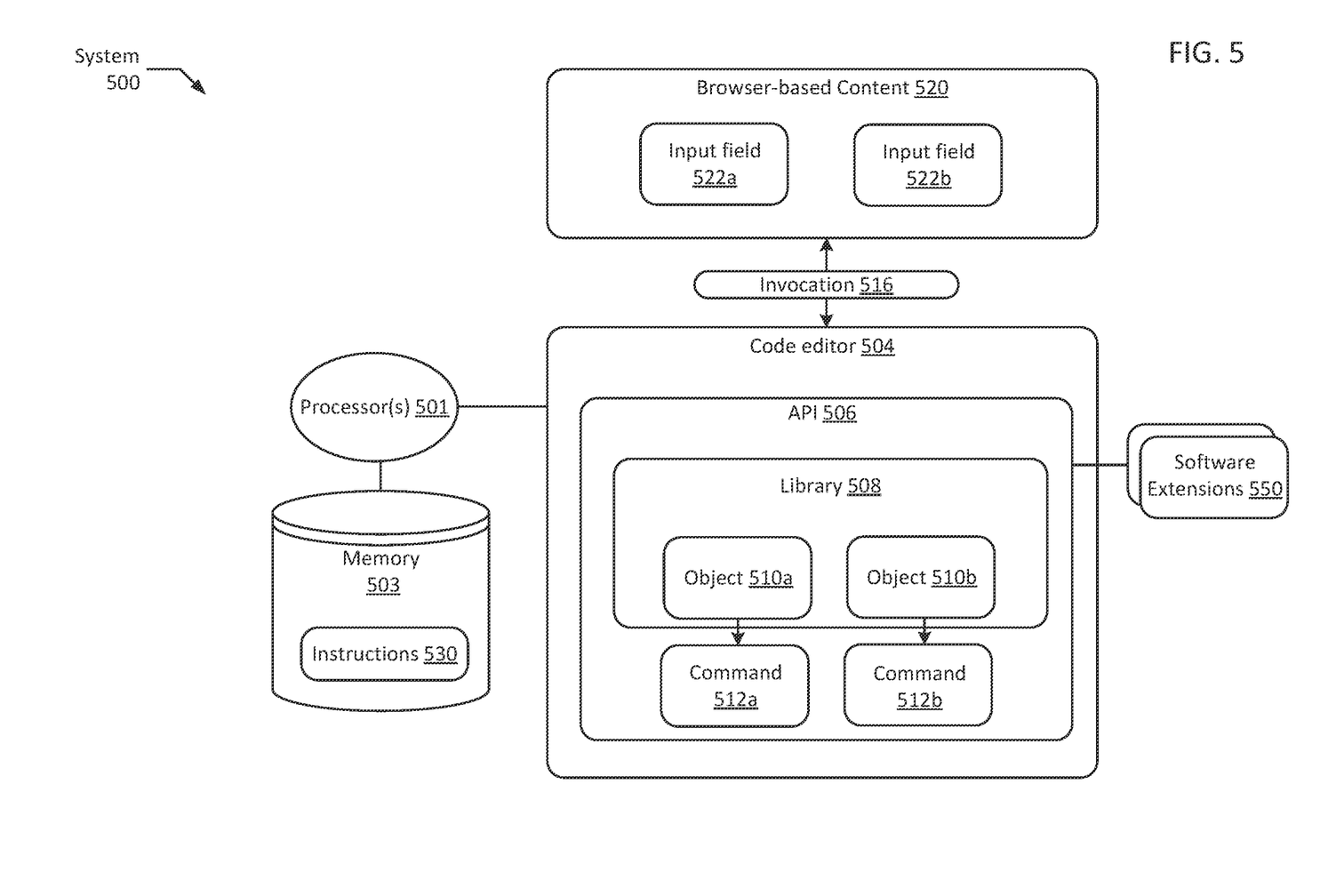
FIG. 5 illustrates a block diagram of an example system for generating configurable multi-input web forms for code editors, according to an example embodiment of the present disclosure.

FIG. 5 is a block diagram of an example system 500 for generating configurable multi-input browser-based content (e.g., WebView content) for code editors, according to an example embodiment of the present disclosure. The system 500 includes a memory 503 and one or more processors 501 in communication with the memory 503.

The memory 503 may be non-transitory computer-readable memory and may store instructions 530. The instructions 530, when executed by the one or more processors 501 may be configured to execute a code editor 504. The instructions 530 may be further configured to identify an API of the code editor. For example, instructions 530 may execute API 506 that may be effective to generate software extensions, such as software extensions 550. A library 508 may be imported into the API 506. The library 508 may be configured to implement browser-based content (e.g., WebView content). One or more commands (e.g., command 512*a* and command 512*b*) may be generated using at least one object defined in the library 508. For example, command 512*a* may be generated using object 510*a* and command 512*b* may be generated using object 510*b*. In various examples, the commands may define respective input fields to be displayed in browser-based content.

In various examples, an invocation 516 of the API 506 may be received. For example, a user may call the API 506. In various examples, in response to invocation of the API 506, browser-based content 520 may be displayed. The browser-based content 520 may comprise any number of input fields. For example, the browser-based content 520 may be WebView content comprising input field 522*a* and input field 522*b*. In at least some examples, command 512*a* may be configured to generate input field 522*a* and command 512*b* may be configured to generate input field 522*b*.

Among other potential benefits, the various systems and techniques described herein allow for configurable, multi-input browser-based forms to be generated for code editors such as Visual Studio Code, even when extension APIs of the code editors do not natively support such multi-input forms. Additionally, the native look and feel of the host platform of the code editor may be maintained such that the multi-input browser based forms appear native to the host platform of the code editor. In some further examples, pre-submit validation logic may be provided in the browser-based content such that user-input values may be validated prior to submit. The various techniques described herein allow for a user of a VSCode extension API to be queried for input via a single multi-input WebView form (or a minimal number of WebView forms) rather than presenting the user with a series of single-input forms.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as application specific integrated circuits (ASICs), field programmable gate arrays (FPGAs), digital signal processors (DSPs) or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method, comprising:
   identifying an application programming interface (API) of a code editor, the API used to generate software extensions;
   importing a library into the API, the library configured to implement browser-based content within the code editor, the library comprising a plurality of software-defined objects;
   generating one or more commands, by a user of the code editor, comprising at least one object of the software-defined objects of the library into source code entered into the code editor, wherein execution of the one or more commands causes a plurality of input fields to be displayed in the browser-based content within an interface of the code editor in response to a user invoking the API;
   receiving an invocation of the API;
   executing the one or more commands in response to the invocation of the API; and
   causing display of the browser-based content comprising the plurality of input fields in the interface of the code editor in response to executing the one or more commands.

2. The method of claim 1, further comprising:
   receiving, in a first field of the plurality of input fields, first data; and
   programmatically integrating the first data into a native interface of the code editor.

3. The method of claim 1, further comprising:
   receiving, from the code editor, theme data indicating a theme employed by a user invoking the API; and
   modifying the browser-based content using the theme data to employ the theme.

4. The method of claim 3, wherein the theme data defines at least one of a text format, a text color, or a background color of the code editor.

5. The method of claim 1, further comprising modifying a hypertext markup language (HTML) file to include logic causing a first interaction with a first field of the plurality of input fields to cause a response in a second field of the plurality of input fields.

6. The method of claim 1, further comprising:
   receiving respective data in each field of the plurality of input fields; and
   programmatically integrating the respective data into the interface of the code editor, wherein the respective data defines at least one of a name of a user, a name of a first software extension, a version number, or a storage location of the first software extension.

7. The method of claim 1, further comprising modifying a hypertext markup language (HTML) page, wherein the HTML page is referenced by the library, and wherein modification of the HTML page results in a modification of the displayed browser-based content.

8. A system comprising:
   at least one processor;
   a code editor executed by the at least one processor; and
   non-transitory computer-readable memory storing instructions that, when executed by the at least one processor, are configured to:
      identify an application programming interface (API) of the code editor, the API used to generate software extensions;
      import a library into the API, the library configured to implement browser-based content within the code editor, the library comprising a plurality of software-defined objects;
      generate one or more commands, by a user of the code editor, comprising at least one object of the software-defined objects of the library into source code entered into the code editor, wherein execution of the one or more commands causes a plurality of input fields to be displayed in the browser-based content within an interface of the code editor in response to a user invoking the API;
      receive an invocation of the API;
      execute the one or more commands in response to invocation of the API; and
      cause the browser-based content comprising the plurality of input fields to be displayed in the interface of the code editor in response to executing the one or more commands.

9. The system of claim 8, the non-transitory computer-readable memory storing further instructions that, when executed by the at least one processor, are further configured to:
   receive, in a first field of the plurality of input fields, first data; and
   programmatically integrate the first data into a native interface of the code editor.

10. The system of claim 8, the non-transitory computer-readable memory storing further instructions that, when executed by the at least one processor, are further configured to:
    receive, from the code editor, theme data indicating a theme employed by a user invoking the API; and
    modify the browser-based content using the theme data to employ the theme.

11. The system of claim 10, wherein the theme data defines at least one of a text format, a text color, or a background color of the code editor.

12. The system of claim 8, the non-transitory computer-readable memory storing further instructions that, when executed by the at least one processor, are further configured to:
    modify a hypertext markup language (HTML) file to include logic causing a first interaction with a first field of the plurality of input fields to cause a response in a second field of the plurality of input fields.

13. The system of claim 8, the non-transitory computer-readable memory storing further instructions that, when executed by the at least one processor, are further configured to:
   receive respective data in each field of the plurality of input fields; and
   programmatically integrate the respective data into the interface of the code editor, wherein the respective data defines at least one of a name of a user, a name of a first software extension, a version number, or a storage location of the first software extension.

14. The system of claim 8, the non-transitory computer-readable memory storing further instructions that, when executed by the at least one processor, are further configured to:
   modify a hypertext markup language (HTML) file, wherein the HTML page is referenced by the library, and wherein modification of the HTML page results in a modification of the displayed browser-based content.

15. A non-transitory machine readable medium storing a program, which when executed by at least one processor causes the at least one processor to:
   identify an application programming interface (API) of a code editor, the API used to generate software extensions;
   import a library into the API, the library configured to implement browser-based content within the code editor, the library comprising a plurality of software-defined objects;
   generate one or more commands, by a user of the code editor, comprising at least one object of the software-defined objects of the library into source code entered into the code editor, wherein execution of the one or more commands causes a plurality of input fields to be displayed in the browser-based content within an interface of the code editor in response to a user invoking the API;
   receive an invocation of the API;
   execute the one or more commands in response to the invocation of the API; and
   cause display of the browser-based content comprising the plurality of input fields in the interface of the code editor in response to executing the one or more commands.

16. The non-transitory machine readable medium of claim 15, storing the program, which, when executed by the at least one processor, further causes the at least one processor to:
   receive, in a first field of the plurality of input fields, first data; and
   programmatically integrate the first data into a native interface of the code editor.

17. The non-transitory machine readable medium of claim 15, storing the program, which, when executed by the at least one processor, further causes the at least one processor to:
   receive, from the code editor, theme data indicating a theme employed by a user invoking the API; and
   modify the browser-based content using the theme data to employ the theme.

18. The non-transitory machine readable medium of claim 17, wherein the theme data defines at least one of a text format, a text color, or a background color of the code editor.

19. The non-transitory machine readable medium of claim 15, storing the program, which, when executed by the at least one processor, further causes the at least one processor to:
   modify a hypertext markup language (HTML) file to include logic causing a first interaction with a first field of the plurality of input fields to cause a response in a second field of the plurality of input fields.

20. The non-transitory machine readable medium of claim 15, storing the program, which, when executed by the at least one processor, further causes the at least one processor to:
   receive respective data in each field of the plurality of input fields; and
   programmatically integrate the respective data into the interface of the code editor, wherein the respective data defines at least one of a name of a user, a name of a first software extension, a version number, or a storage location of the first software extension.

* * * * *